(12) United States Patent
Kono et al.

(10) Patent No.: US 7,277,771 B2
(45) Date of Patent: Oct. 2, 2007

(54) THREE-DIMENSIONAL FOAM ANALYSIS METHOD, PRODUCT DESIGN AIDING METHOD USING THE ANALYSIS METHOD, AND RECORDING MEDIUM RECORDING THESE METHODS

(75) Inventors: Tsutomu Kono, Kawasaki (JP); Junichi Saeki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/153,468

(22) Filed: Jun. 16, 2005

(65) Prior Publication Data
US 2006/0004481 A1    Jan. 5, 2006

(30) Foreign Application Priority Data
Jul. 2, 2004    (JP) ............................. 2004-196190

(51) Int. Cl.
B29C 45/00    (2006.01)
G06G 7/48    (2006.01)
(52) U.S. Cl. ............................ 700/200; 703/9; 700/203
(58) Field of Classification Search ................ 700/200; 703/9
See application file for complete search history.

(56) References Cited

U.S. PATENT DOCUMENTS 5,572,434 A * 11/1996 Wang et al. ................. 700/197
5,740,074 A * 4/1998 Wang et al. ................. 700/266
5,835,379 A * 11/1998 Nakano ....................... 700/197
5,940,309 A * 8/1999 White et al. .................... 703/7
6,611,736 B1 * 8/2003 Waite et al. ................. 700/281
6,816,820 B1 * 11/2004 Friedl et al. .................... 703/2
2006/0000576 A1 * 1/2006 Caulk .......................... 164/457

FOREIGN PATENT DOCUMENTS

JP    2001-318909    * 11/2001
JP    2003-091561    * 3/2003

* cited by examiner

Primary Examiner—Ryan A. Jarrett
(74) Attorney, Agent, or Firm—Antonelli, Terry, Stout & Kraus, LLP.

(57) ABSTRACT

To regulate the passage structure of a foaming die and the injected amount of foaming material, the flow behavior of the foaming material is analyzed by obtaining a flow velocity and a pressure by inputting the density as a function, including the elapsed time from the passage through an injection port to the foaming die and the thickness, and substituting a calculated density in equations of continuity and motion. In the analysis, the viscosity of the foaming material is used as a function including a time term. The boundary and molding conditions are corrected when the calculation does not converge. The density and pressure distributions of the foaming material are determined when the calculation converges. When the density and pressure distributions depart from design tolerances, the foaming passage structure and foaming material injected amount are regulated by an analysis program that corrects the model form, physical property or molding condition.

4 Claims, 9 Drawing Sheets

THE INJECTION PORT AND NUMBERS OF THE FINITE ELEMENTS

| | D | E | F | |
| --- | --- | --- | --- | --- |
| | | A ← THE INJECTION PORT | C | |
| | | B | | |

| TIME INCREMENT | SUM OF THE TIME INCREMENTS | ELEMENT | VELOCITY | DENSITY | VISCOSITY | ELAPSED TIME AFTER THE FLUID PASSED THROUGH THE INJECTION PORT |
| --- | --- | --- | --- | --- | --- | --- |
| $\Delta t1$ | $\Delta t1$ | A | $V_{A1}$ | $\rho 1$ | $\eta 1$ | $\Delta t1$ |
| $\Delta t2$ | $\Delta t1 + \Delta t2$ | A | $V_{A2}$ | $\rho 2$ | $\eta 2$ | $\Delta t2$ |
| | | B | $V_{B2}$ | $\rho 3$ | $\eta 3$ | $\Delta t1 + \Delta t2$ |
| | | C | $V_{C2}$ | | | |
| | | D | $V_{D2}$ | | | |
| | | E | $V_{E2}$ | | | |
| | | F | $V_{F2}$ | | | |

THREE-DIMENSIONAL FOAM ANALYSIS METHOD, PRODUCT DESIGN AIDING METHOD USING THE ANALYSIS METHOD, AND RECORDING MEDIUM RECORDING THESE METHODS

The present application claims priority from Japanese application JP2004-196190, filed on Jul. 2, 2004, the content of which is hereby incorporated by reference into this application.

BACKGROUND OF THE INVENTION

The present invention relates in general to a plastic foam molding and manufacturing technique; and, in particular, the invention relates to a three-dimensional foaming flow analysis method for use in the foam-molding of a foam part, such as a heat insulator and a shock absorber, to be used in a refrigerator, as a building material and in an automobile.

JP-A-2001-318909 and JP-A-2003-91561 disclose an analysis program which employs a function of density control in the manufacture of a foaming material using time as a variable, whereby a foaming behavior having a density decreasing with time can be analyzed.

According to JP-A-2001-318909, in particular, the entire body of foaming material is regarded as having a uniform density, and the density is a density calculated on the basis of the elapsed time after the foaming material first exits from a nozzle, which outputs a foaming material obtained by beating a foaming ingredient.

JP-A-2003-91561 discloses that a foaming flow analysis can be performed on a foaming material by using a function based on the fact that the density of the foaming material depends on a change in the thickness, in addition to the technique disclosed in JP-A-2001-318909.

In an actual manufacturing process, a foaming material near the outlet of a nozzle has a substantially constant density which does not change with time.

The influence of the foaming material that is first output from a nozzle decreases the liquidity of the foaming material subsequently output from the nozzle. Therefore, while the result of the foaming flow analysis up to about one second may be usable as an approximate value, the result of the foaming flow analysis for a longer period of time may be significantly different from the real value. For these reasons, the analysis according to JP-A-2001-318909 and JP-A-2003-91561 has a low precision.

JP-A-2003-91561 further discloses that the densities of foaming resins are displayed in groups. However, since the grouping is based on the thicknesses of the foaming resins, similar outputs to those of JP-A-2001-318909 are disadvantageously given an equal thickness.

SUMMARY OF THE INVENTION

It is an object of the present invention to enhance the precision of a foaming flow analysis.

It is another object of the present invention to implement a foaming flow analysis, whereby a grouping based on foaming densities can be implemented even with an equal thickness by using a fixed value as the densities of the foaming materials output from a nozzle.

In order to solve the problems mentioned above, according to one aspect of the present invention, there is provided a three-dimensional foaming flow analysis method or foaming flow analysis program, characterized in that the density of a foaming material is input as a function, including the elapsed time after the passage through an injection port, the method or program including the step of performing a calculation by substituting a change in density at every time step in an equation of continuity and an equation of motion, so that a result, such as a pressure, a flow velocity and a density distribution, can be obtained therefrom.

In a foaming phenomenon of an actual urethane ingredient, for example, since the viscosity also exhibits a behavior depending on a curing reaction including a time term, there is provided, according to another aspect of the present invention, a three-dimensional foaming flow analysis method or foaming flow analysis program, including the steps of performing a calculation for a detail foaming flow analysis by inputting not only the density, but also the viscosity, as functions, including the elapsed time after the passage of the foaming method through an injection port, and substituting changes in the density and viscosity at every time step in an equation of continuity and an equation of motion, so that a result, such as a pressure, a flow velocity and a density distribution can be obtained therefrom.

According to the present invention, the precision of analysis of a foaming flow analysis system can be enhanced.

DESCRIPTION OF THE PREFERRED EMBODIMENTS

Embodiments according to the present invention will be described below with reference to the attached drawings.

First Embodiment

Figure 1:
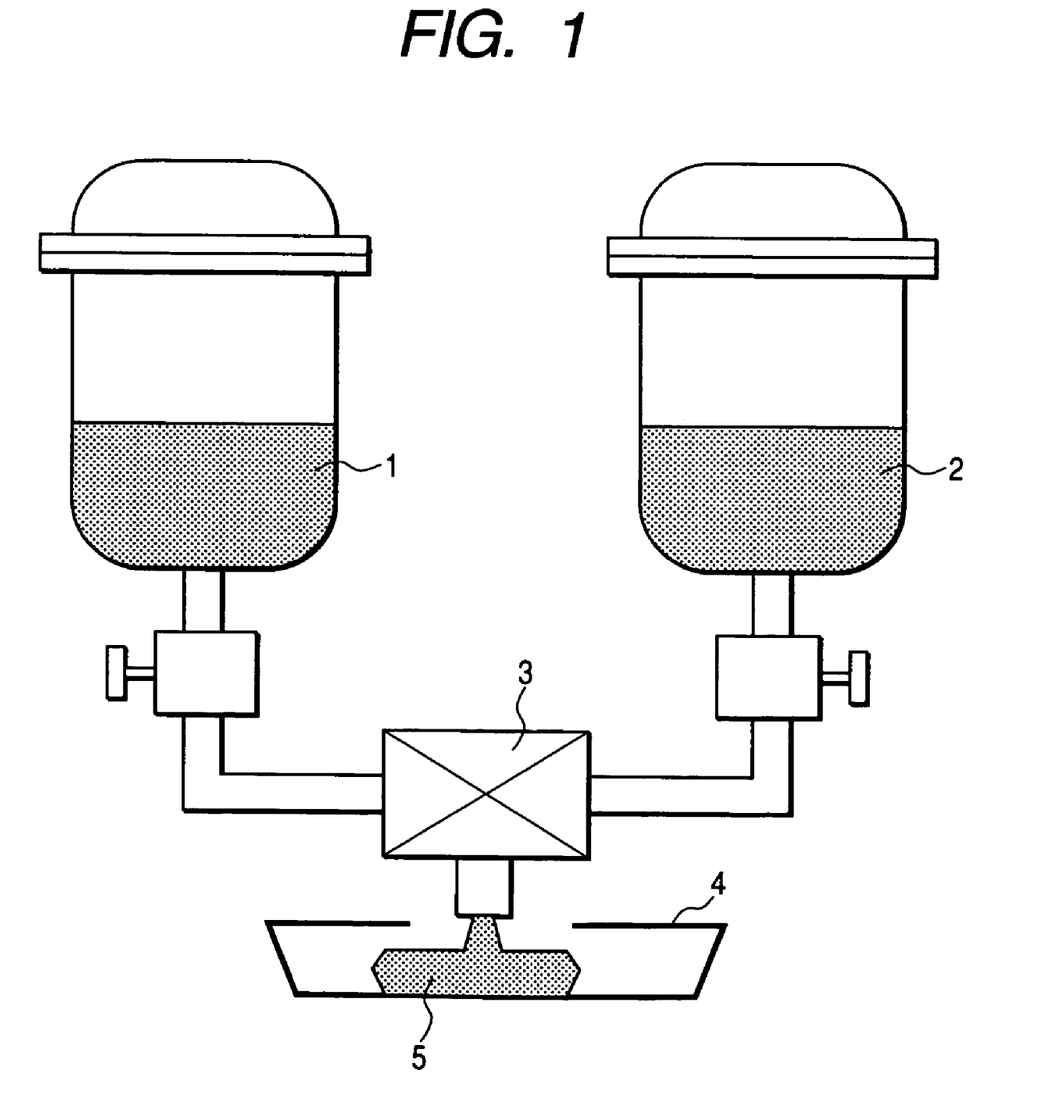
FIG. 1 is a diagram showing a process of foaming by mixing two fluids consisting of polyol and isocyanate.

First of all, a foam molding step to be analyzed will be described with reference to FIG. 1.

The foam molding step is implemented by injecting a foaming material into a foaming die through a nozzle of a foaming material filler. The foaming material filler has a plurality of tanks for storing foaming ingredients, valves for controlling the amounts of ingredients output from the tanks, and a mixing head connected to the multiple tanks through the valves for outputting, from a nozzle thereof, a foaming material containing a mix of foaming ingredients which flow from the multiple tanks.

In this embodiment, foaming is implemented by storing polyol 1 containing a cyclopentane ($C_5H_{10}$) foaming material in one tank, storing isocyanate 2 in another tank, beating the two fluids by means of the mixing head 3 and injecting a foaming material 5, resulting from the beating of the two fluids into a foaming die 4.

Next, a foaming flow analysis system which is applied to the foaming material produced in the foam molding step for producing a foam product will be described. The foaming flow analysis system functions on the basis of software to produce the flow shown in FIG. 3, which will be described later, which software is executed in the hardware configuration shown in FIG. 5.

Figure 5:
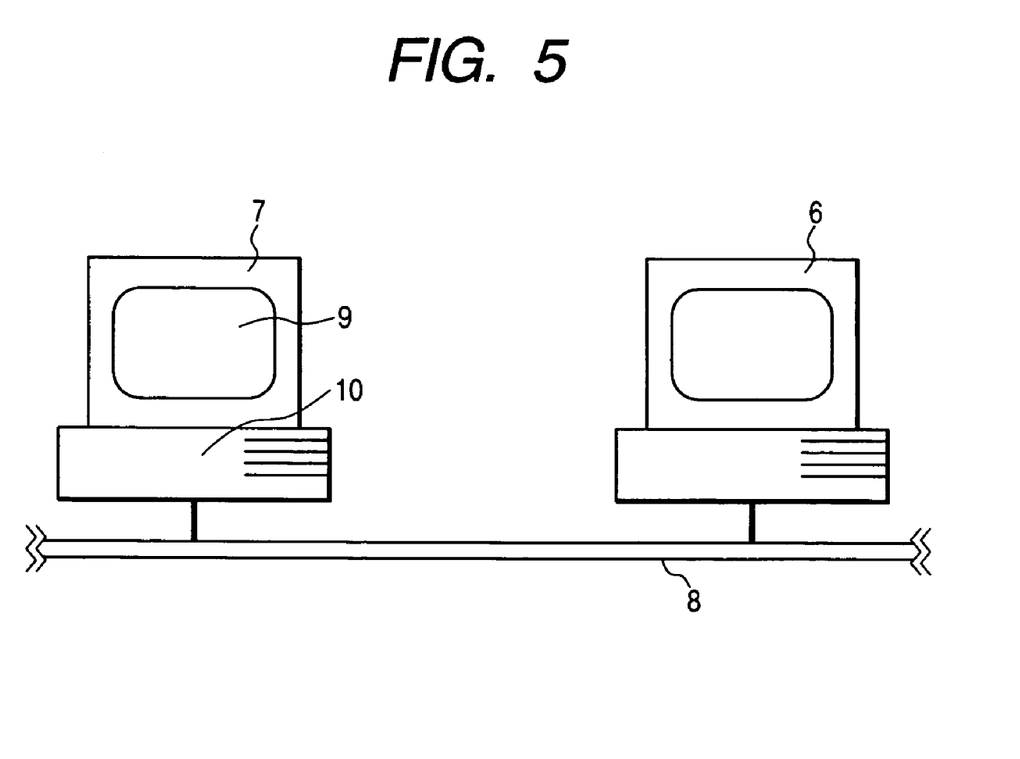
FIG. 5 is a diagram of a hardware configuration for performing a foaming analysis.

More specifically, as seen in FIG. 5, the foaming flow analysis system includes a calculator 6, a calculator 7 having a recording device 10 (such as a hard disk and a magneto-optical disk (MO)), a LAN 8 for connecting these two calculators, and a display device 9 included in the calculator 7. CAD (Computer-Aided Design System) data created by the calculator 6 is configured for transfer to the calculator 7 through the LAN 8. The CAD data transferred to the calculator 7 is recorded in the recording device 10 (such as a hard disk and an MO) of the calculator 7. The calculator 7 performs a calculation by following the process illustrated by the flowchart shown in FIG. 3, records the result in the recording device 10 and then displays the result on the display device 9. Although not shown, each of the calculators 6 and 7 includes an input device, such as a keyboard and a mouse.

Figure 3:
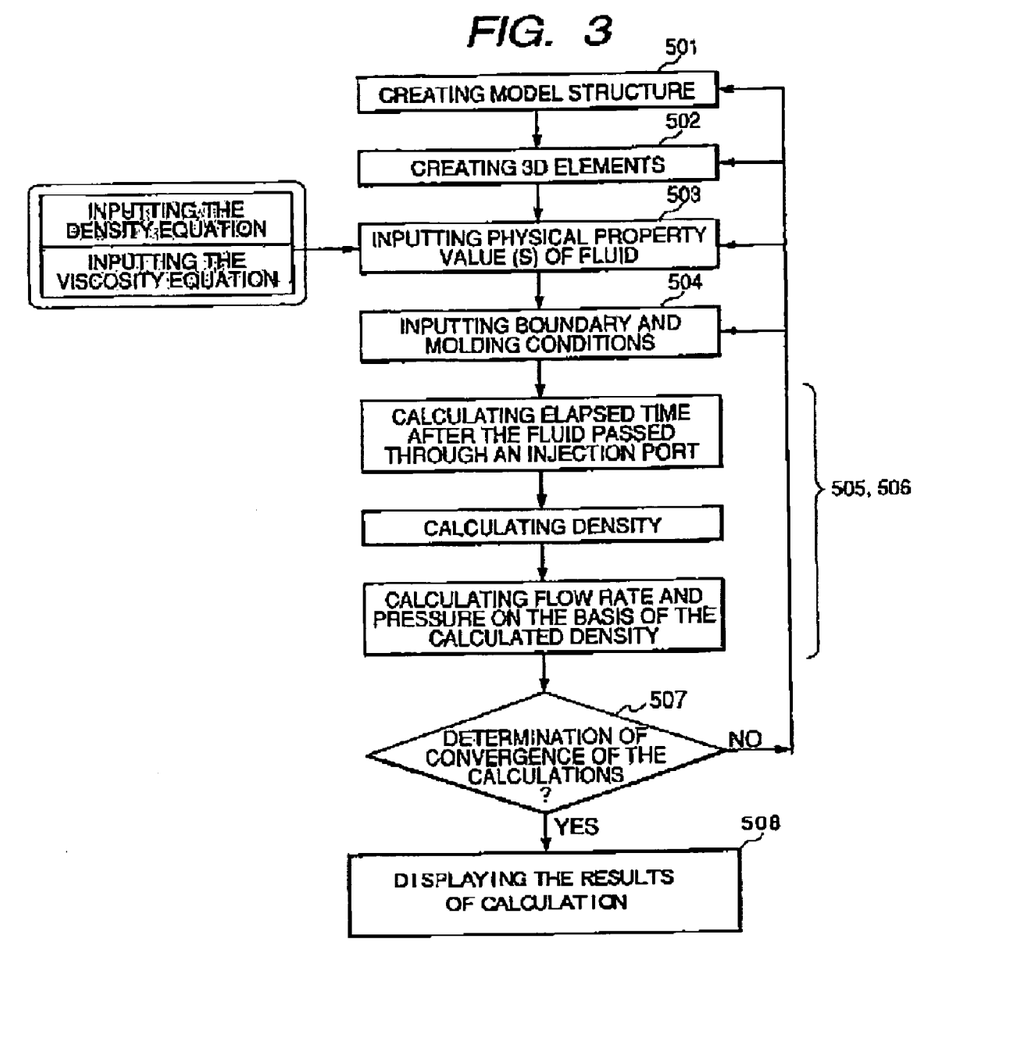
FIG. 3 is a flowchart of a foaming flow analysis in a case which functions, including an elapsed time term and a thickness term, are input after the foaming material passes through the injection port.

Next, the processing of the foaming flow analysis program will be described with reference to the flowchart shown in FIG. 3.

In the Creating Model Structure step 501, a model to be analyzed, which is selected by an operator through the input device, that is, structure data defining a space to be filled with a foaming material, is loaded from the recording device 10. More specifically, CAD data of an initial design model of a part which is to be formed of a foaming material is loaded from the recording device 10.

Next, in the Creating 3D Solid Elements step 502, the structure of a thermal-insulating portion to be filled with a foaming material is decomposed into a plurality of specific spaces (the finite elements of the three-dimensional solid) by using the data loaded in the Creating Model Structure step 501, whereby form data of each of the finite elements is created.

Next, in the Inputting Physical Property Value(s) of Fluid step 503, a display is given for prompting an operator to input a density equation (5) and a viscosity equation (6), which are physical property values of a foaming material to be analyzed, and this data is received from the input device.

Next, in the Inputting Boundary and Molding Conditions step 504, a display is given for prompting the operator to input an initial velocity, initial density, initial viscosity, place to inject and thickness for injecting a fluid to the three-dimensional solid element, and this data is received from the input device. The sectional area of the injection port is calculated from the received data of the place to inject and the form data loaded in the Creating Model Structure step 501.

Next, a command to start the analysis and an initial time increment $\Delta t1$ are received from the operator.

In step 505, based on this command, the velocity, pressure, density and viscosity with which the foaming material flows are calculated by invoking an equation of continuity (1) and equations of motion (2) to (4) that have been stored in the recording device and substituting the input initial time increment, initial velocity, initial density, initial viscosity, viscosity equation (6) and density equation (5) therein. The first calculation results, the initial time increment $\Delta t1$ and the position of a finite element closest to the injection port 11 (shown in FIG. 2) associated with each other are stored in the recording device.

Next, in step 506, the calculation in step 505 is repeated, and the substituted time increments (including the initial time increment) are added. In other words, the elapsed time after the foaming material passes through the injection port until the foaming material reaches the three-dimensional solid element is calculated. Notably, the initial time increment $\Delta t1$ is only used for the first calculation, and the second and subsequent calculations serve to calculate time increments sufficient for securing the required convergence stability and the results are substituted in place of the initial time increment $\Delta t1$. Here, the second time increment $\Delta t2$ is used for the second calculation.

The second calculation is performed not only on the finite element (first finite element) closest to the injection port, but also on a finite element unit (a second finite element) adjacent thereto in the direction in which the foaming material flows (direction indicated by the velocity). In the second calculation, for example. the calculation on the first finite element uses a second time increment $\Delta t2$ which is newly obtained by the calculation. The calculation of the second finite element uses the velocity, density and viscosity, which are outputs of the first finite element, as input values. However, the density and viscosity are calculated by using the elapsed time after the foaming material passes through the injection port until the foaming material reaches the finite element (initial time increment $\Delta t1$ +second time increment $\Delta t2$).

Figure 4:
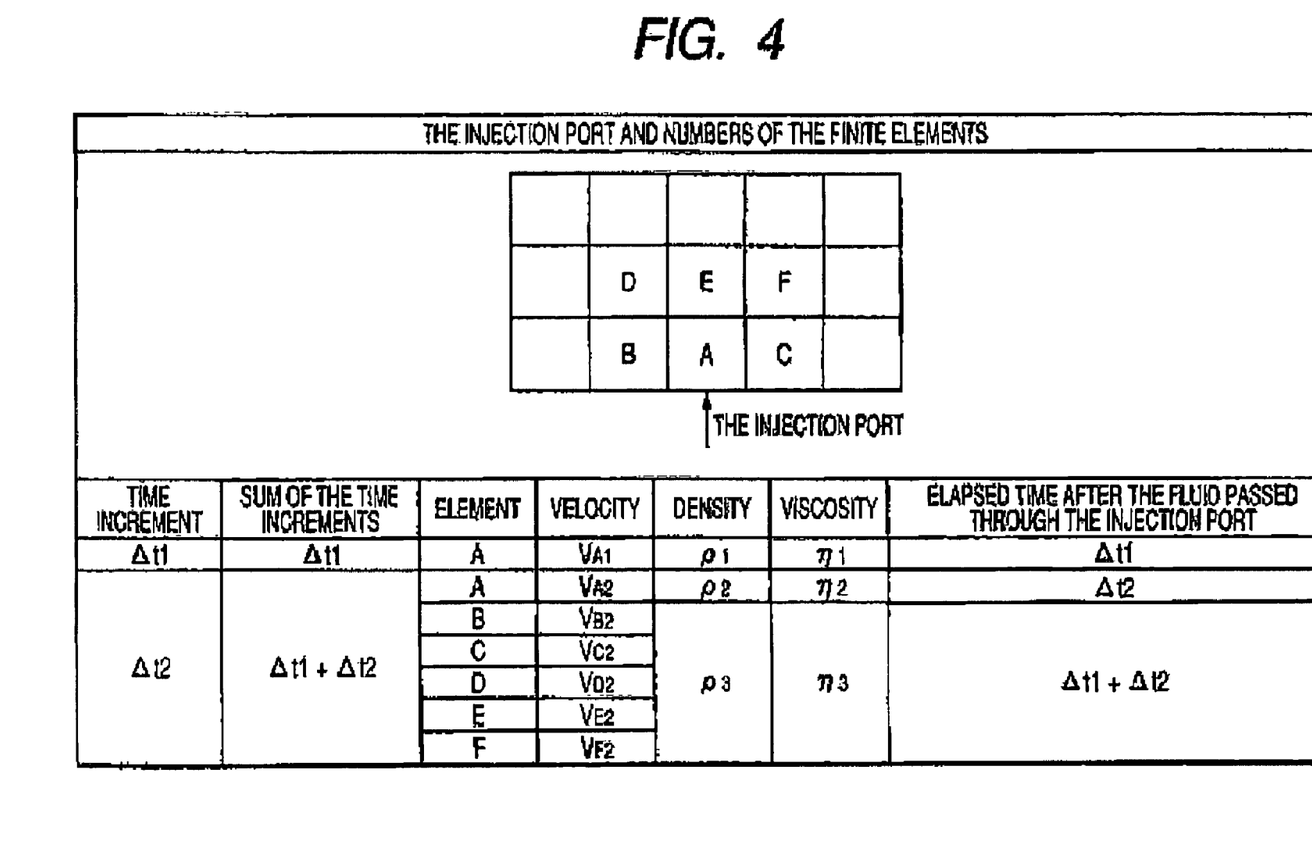
FIG. 4 is a table showing items in the calculation for each element, for each time increment.

As the second output, the positions of the finite elements (first finite element and second finite element), the elapsed times after the foaming the finite elements (which is the calculated time increment $\Delta t2$ to the first finite element and is the sum of the initial time increment $\Delta t1$ and the calculated time increment $\Delta t2$ to the second finite element), the velocity, the density and the viscosity associated with each other are stored. FIG. 4 shows a data table that stores the first output and the second output. As described above, the foaming material is injected from the injection port 11 into the Element A (first element, and the velocity $V_{A1}$, density p1, and viscosity n1 with the initial time increment $\Delta t1$ are calculated. For using equations (5) and (6). On the other hand, for the second finite elements B to F, the second calculation is performed by using those values as initial values. Here, the second finite elements B to F have different velocities from each other ($V_{B2}$ to $V_{F2}$), but have an equal time $\Delta t1+\Delta t2$ after the passage through the injection port. Therefore, the second finite elements B to F have an equal density p3 and viscosity n3 when they have an equal thickness value from Equations (5) and (6). The third and subsequent calculations are performed as in the second calculation.

The repeated operation includes pre-storing the volumes of the finite elements, obtaining the sum of the volumes of the finite elements used for the calculation and quitting if the sum agrees with the foam volume of the model obtained from the form data.

In step 507, a determination of the convergence is obtained. The convergence determination method compares the pressure and a predetermined pressure range, and convergence is determined when the pressure is within the range. If convergence is not determined, the method returns to one of steps 501 to 504. At that time, the method prompts an operator to input a command to determine the step to which to return.

Next. if the convergence is determined, a display is given including the elapsed time after the foaming material passes through the injection port until the foaming material reaches the finite element, density and viscosity, as shown in Step 508. FIGS. 6 to 9 show examples of the display.

Figure 6:
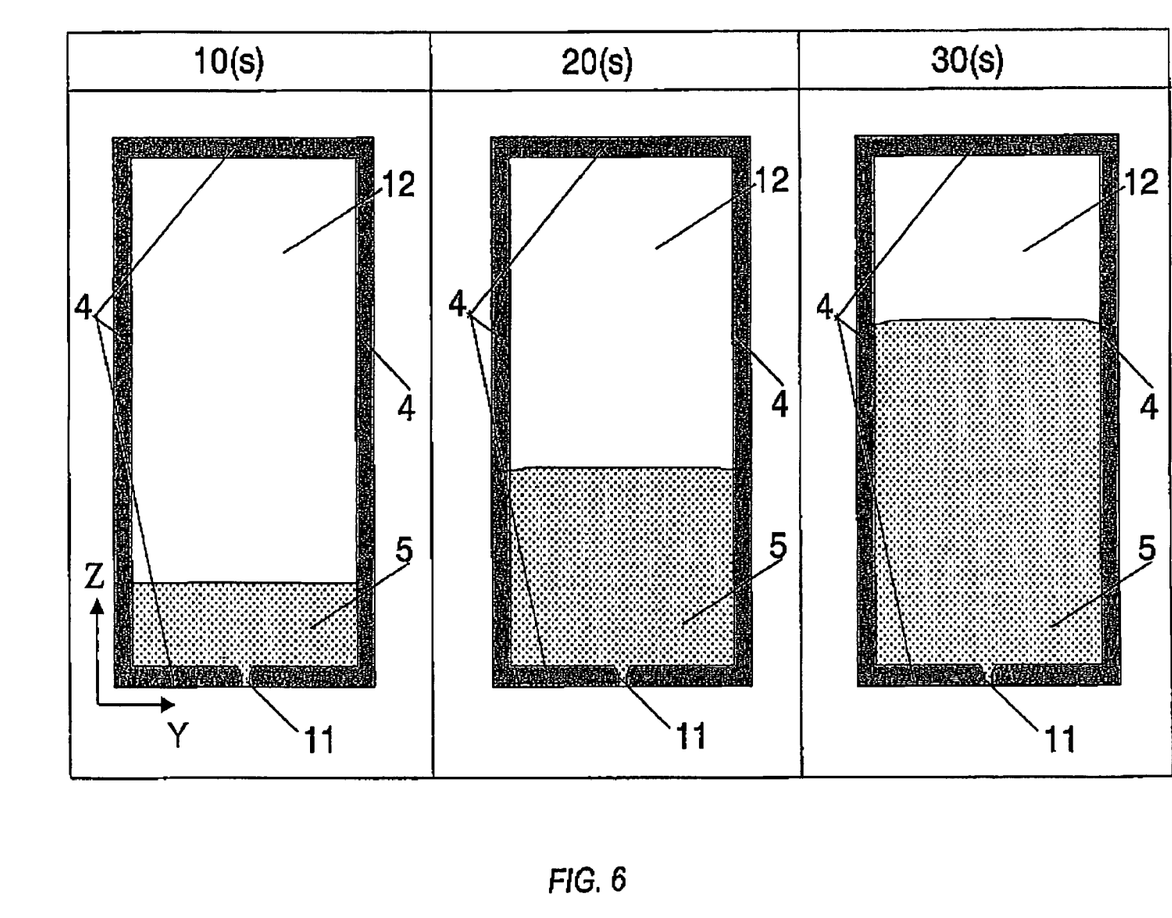
FIG. 6 is a diagram showing a foaming analysis result (that is, a process of a foaming flow of a material with changes in time)

FIG. 6 shows an example of a foaming analysis. This is a result on the YZ plane at the center part of the thickness, subject to a foaming flow analysis, which is carried out by using the form shown in FIG. 2 and linking the density equation (5) and the viscosity equation (6) with the equation of continuity (1) and the equations of motion (2) to (4). The gravity is applied to a foaming area 12 in the negative direction of the Z-axis where the foaming area 12 is 500 (mm) high, 250 (mm) wide and 40 (mm) thick. In this case, the foaming material 5 having an initial density of $\rho_0$=1000 (kg/m$^3$) is continuously injected at a flow rate of 0.2 (kg/s) (where "s" refers to second(s)) from the injection place 11 in the positive direction of the Z-axis. A is equal to 1 in Equation (5), the initial viscosity $\eta_0$ in Equation (6) is 1 (Pa s), and the constants inherent to the material are F=1.2 and te=60. Here, a foaming flow process of the material with changes in time is shown, and the filled amounts of the foaming material 5 at 10 (s), 20 (s) and 30 (s) are shown. In this way, the process can be analyzed in which the foaming material 5 injected to the foaming area 12 is foaming and flowing in the positive direction of the Z-axis.

Figure 7:
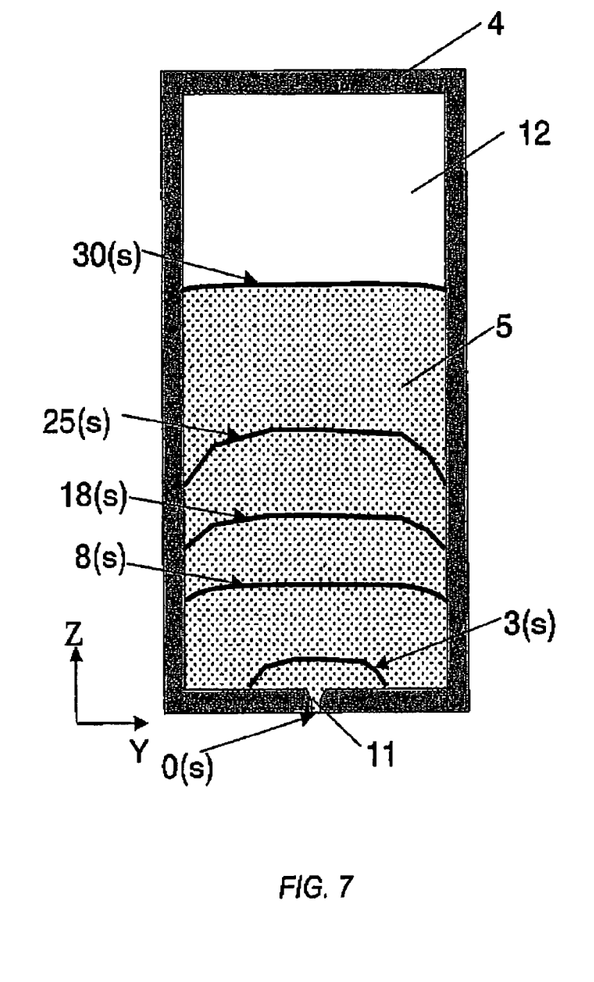
FIG. 7 is a diagram showing a foaming analysis result (that is, a distribution of the elapsed times after the foaming material passes through the injection port)

FIG. 7 shows, as an example of the output result from the analysis, a distribution, based on the elapsed time, at 30 (s) after the passage of the foaming material through the injection port. The lines shown in the drawing indicate positions at equal elapsed times where the elapsed time of the fluid passing through the injection port is 0 (s), and the elapsed time of the fluid injected first in the positive direction of Z-axis is 30 (s).

Figure 8:
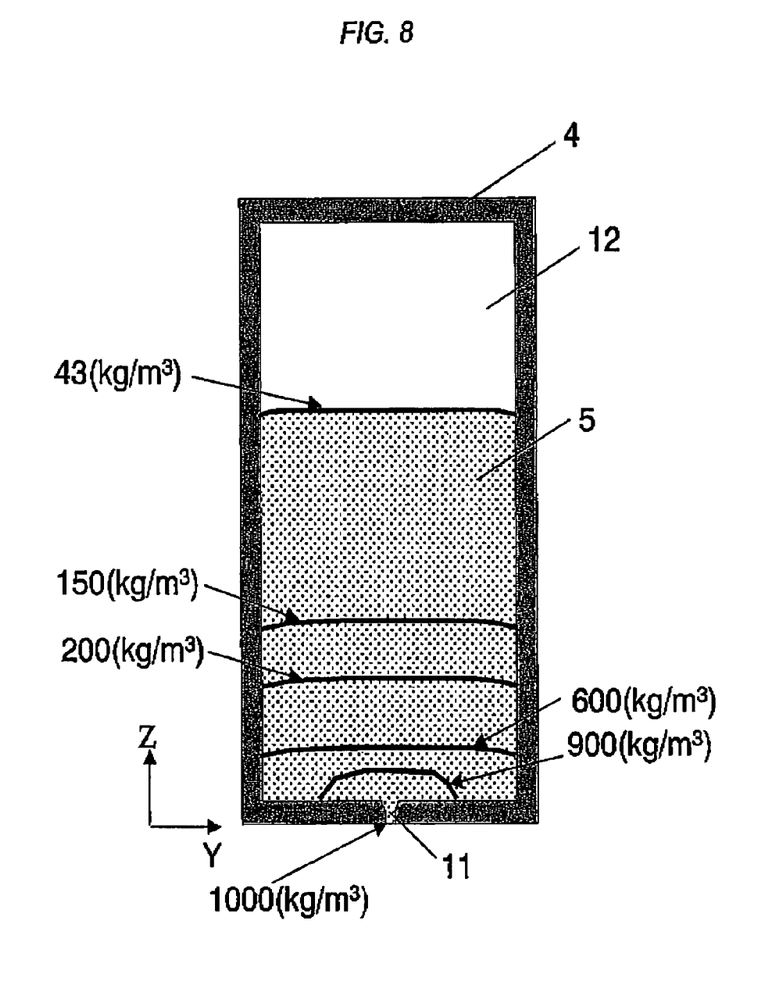
FIG. 8 is a diagram showing a foaming analysis result (that is, a distribution of density)

FIG. 8 shows a distribution of foaming density after 30 (s). The foaming density is, as expressed in Equation (5), a function of the elapsed time after the passage of the foaming material through the injection port. Here, the lines shown in the drawing indicate positions with equal density where, in the distribution, the density at the injection port is an initial density of 1000 (kg/m$^3$), which is the highest, and the density at the end (in the positive direction of the Z-axis) of the foaming material injected first is the lowest.

Figure 9:
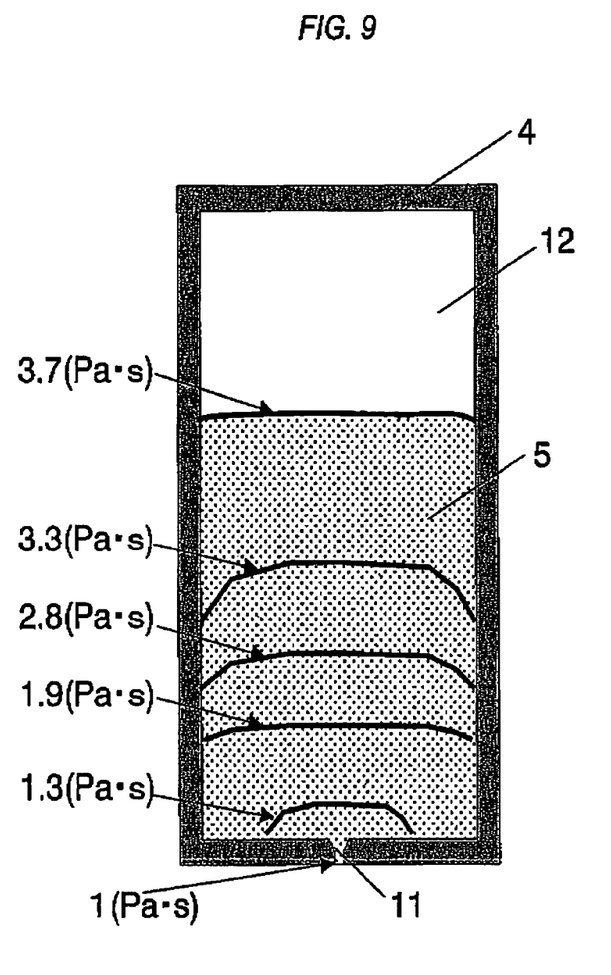
FIG. 9 is a diagram showing a foaming analysis result (that is, a distribution of viscosity).

FIG. 9 shows a distribution of the viscosity after 30 (s). The viscosity is, as expressed in Equation (6), a function of the elapsed time after the passage of the foaming material through the injection port. Here, the lines shown in the drawing indicate positions with equal viscosity where, in the distribution, the viscosity at the injection port is an initial viscosity of 1 (Pa·s), which is the lowest, and the viscosity at the end (in the positive direction of the Z-axis) of the foaming material injected first is the highest.

According to conventional methods. as described above, the three-dimensional flow mechanism of foaming material was generally analyzed using the assumption that the foaming material injected from the injection port 11 was spread into the space as a simple function of the elapsed time after the passage of the foaming material through the injection port.

Such methods, however, do not take into consideration that the foaming material first injected from the injection port into the space decreases the liquidity of foaming material that is subsequently injected into the space. Therefore, the results obtained from this analysis may be significantly different from those obtained in practical use.

In the present invention, the space injected with the foaming material is divided into a plurality of elements and the characteristics (velocity V, density $\rho$, and viscosity n) of each element are calculated using the different elapsed time after the passage of the foaming material through the injection port. According to the analysis described in the present invention, the three-dimensional flow of the foaming material with high reality can be obtained.

Since the analysis evaluates the softness of the foaming material 5, the elasticity rate may be input as a function of density so that the softness of the foaming material 5 can be obtained from the resulting elasticity rate.

The viscosity to be input in step 503 can be expressed by Equation (7) by using a function of time expressed in Equation (5) and the final density after foaming $\rho$min, which is handled as the minimum value of density, in the equation of density expressed by Equation (5).

$$\eta = (\eta_0 (\rho(t)/\rho_{min})^c)/\gamma^n \qquad (7)$$

where $\eta_0$: initial temperature, $\gamma$: shear rate, and c and n: coefficients inherent to a given material.

In this way, the viscosity can be expressed as a relationship between a degree of progress of foaming with respect to the final density after the foaming and the shear rate. However, the viscosity to be used for the present analysis can employ any value, such as a function including a time term, and is not limited only to the function given by Equation (7).

Now, Equations 1 to 6 mentioned above will be described.

It is generally known that the main factors having an influence on the expansion ratio, representing the ratio between the initial density and the final density after foaming, in an urethane foam molding process are mold temperature and thickness. In order to analyze the foaming behavior in consideration of the mold temperature and thickness, the analysis model is divided into three-dimensional solid elements, and the flow velocity, pressure and temperature are calculated by using the equation of continuity (1) and equations of motion (2) to (4), where $\rho$: density, u: velocity in x-direction, $\Sigma$: velocity in y-direction, $\omega$: velocity in z-direction, P: pressure, t: time and $\eta$: viscosity.

These equations may be implemented with software by using the "function including changes in time of $\rho$" and "viscosity $\eta$" as input values.

$$\frac{\partial \rho}{\partial t} + \frac{\partial (\rho u)}{\partial x} + \frac{\partial (\rho v)}{\partial y} + \frac{\partial (\rho \omega)}{\partial z} = 0 \qquad (1)$$

$$\rho \frac{\partial u}{\partial t} = \rho g_x - \frac{\partial P}{\partial x} + \frac{\partial}{\partial x}\left(2\eta \frac{\partial u}{\partial x}\right) + \frac{\partial}{\partial y}\left(\eta\left(\frac{\partial v}{\partial x} + \frac{\partial u}{\partial y}\right)\right) + \qquad (2)$$
$$\frac{\partial}{\partial z}\left(\eta\left(\frac{\partial u}{\partial z} + \frac{\partial \omega}{\partial x}\right)\right) - \rho\left(u\frac{\partial u}{\partial x} + v\frac{\partial u}{\partial y} + \omega\frac{\partial u}{\partial z}\right)$$

$$\rho \frac{\partial v}{\partial t} = \rho g_y - \frac{\partial P}{\partial y} + \frac{\partial}{\partial y}\left(2\eta \frac{\partial v}{\partial y}\right) + \frac{\partial}{\partial x}\left(\eta\left(\frac{\partial u}{\partial y} + \frac{\partial v}{\partial x}\right)\right) + \qquad (3)$$
$$\frac{\partial}{\partial z}\left(\eta\left(\frac{\partial \omega}{\partial y} + \frac{\partial v}{\partial z}\right)\right) - \rho\left(u\frac{\partial v}{\partial x} + v\frac{\partial v}{\partial y} + \omega\frac{\partial v}{\partial z}\right)$$

-continued $$\rho \frac{\partial \omega}{\partial t} = \rho g_z - \frac{\partial P}{\partial z} + \frac{\partial}{\partial z}\left(2\eta \frac{\partial \omega}{\partial z}\right) + \frac{\partial}{\partial y}\left(\eta\left(\frac{\partial v}{\partial z} + \frac{\partial \omega}{\partial y}\right)\right) + \\ \frac{\partial}{\partial x}\left(\eta\left(\frac{\partial u}{\partial z} + \frac{\partial \omega}{\partial x}\right)\right) - \rho\left(u\frac{\partial \omega}{\partial x} + v\frac{\partial \omega}{\partial y} + \omega\frac{\partial \omega}{\partial z}\right) \quad (4)$$

Here, $\alpha\rho/\alpha t=0$ when a fluid with no change in density is handled. However, $\alpha\rho/\alpha t \neq 0$ when a foaming material, such as a refrigerator type of urethane material, is handled. Therefore, changes in density of a foaming material must be additionally calculated in consideration of the mold temperature and thickness, which are the main factors having an influence on the expansion ratio.

Figure 2:
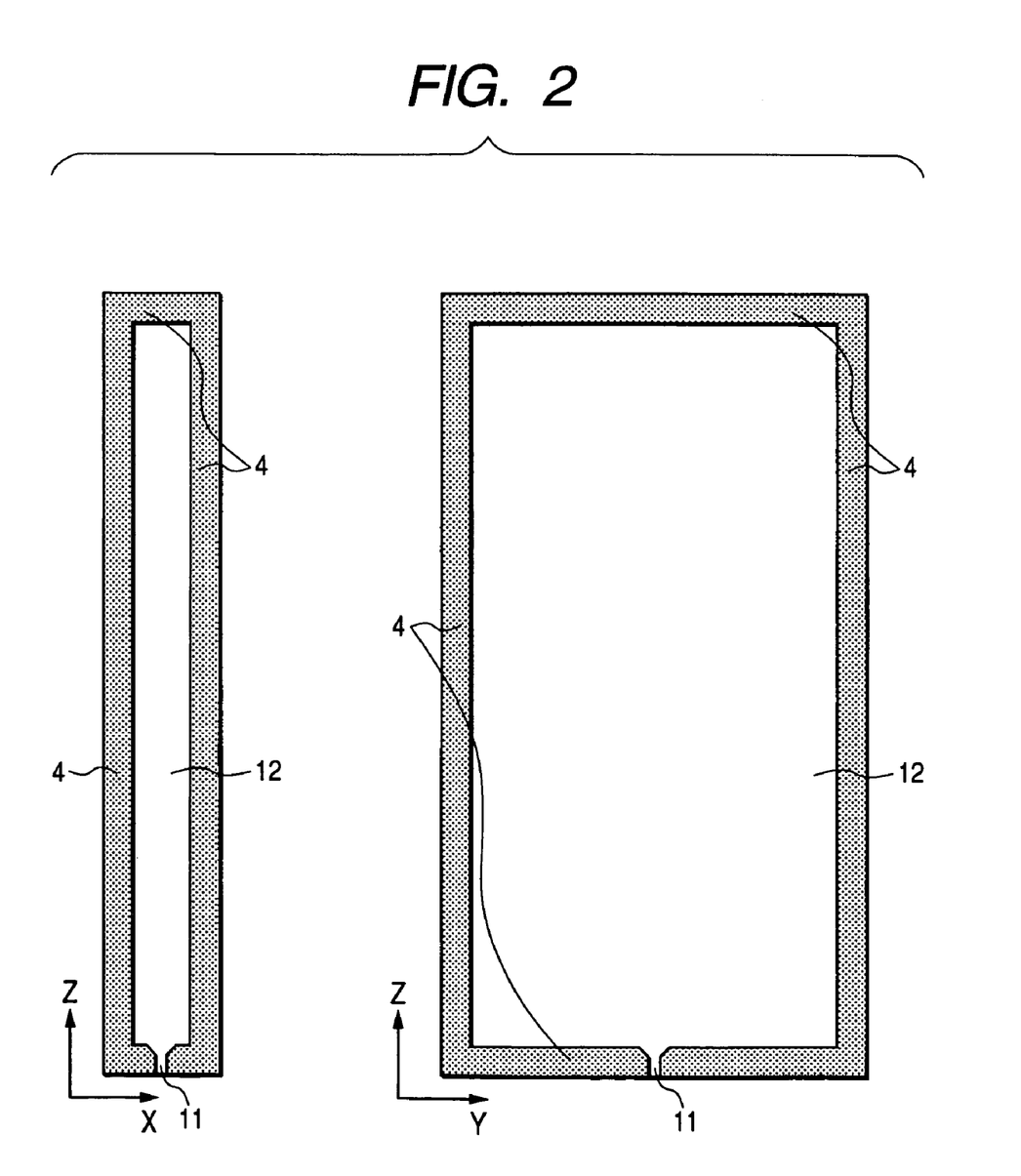
FIG. 2 is a diagram which shows section views of a foaming area within a foaming die used for an analysis and a review.

A change in the density at a given mold temperature may be mathematically expressed by the neglect of variations in temperature at one mold place and variations in mold temperature for each foam molding, and by using a result of a visualization experiment, for example, so that the density can be represented as a function including a time term and a thickness term. FIG. 2 shows section views of the foaming area 12 within the foaming mold 4. Here, the density change function and the viscosity change function are expressed as Equations (5) and (6), respectively, when the foaming material 5, having the initial density $\rho_0$ and initial viscosity $\eta 0$, is injected at a flow rate of Q from the injection port 11 for a certain period of time.

$$\rho(t)=\rho_0/(A \times t^2/H+1) \quad (5)$$

$$\eta=(\eta 0((1+t/te)/(1-t/te))^F \quad (6)$$

where t: elapsed time after the foaming material passes through the injection port, H: product thickness, $\rho_0$: initial density, $\eta 0$: initial viscosity, and A, F and te: constants inherent to the material.

Results, such as the flow velocity, pressure and temperature in foaming, can be obtained by substituting the density and viscosity at each time step, which are obtained by Equations (5) and (6), in Equations (1) to (4). The process in which the material is foaming and flowing can be analyzed by using the density Equation (5).

Here, the thickness H may be calculated as the normal thickness from one wall surface to another wall surface, or it may be arbitrarily input as a thickness value for each coordinate. The thickness can be input by converting a value calculated by other CAD software to the thickness value for each element.

Though the density and viscosity are expressed as functions of time in Equations (5) and (6), the invention is not limited thereto. The density and viscosity may be expressed by equations corresponding to arbitrary functions including a time term and a thickness term (which may be expressed as functions in consideration of variables, such as pressure and viscosity).

While we have shown and described several embodiments in accordance with the present invention, it is to be understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

What is claimed is:

1. A method for analyzing a three-dimensional flow of a foaming material injected into a predetermined space from an injection port comprising the steps of:
   (a) taking in a structure data defining the space from a recording device into a calculation device so as to make a model space shape for analyzing the flow of the foaming material,
   (b) dividing said model space shape into three dimensional solid finite elements being a plurality of specific spaces so as to make the space shape composed of the plural finite elements,
   (c) using at least initial injecting velocity, initial density, initial viscosity, information of a position of an injection port, an initial time increment, density equation, viscosity equation, equation of continuity, and a three-dimensional motion equation so as to calculate fluid velocity, fluid pressure, density and viscosity of the foaming material within a first finite element after the initial time increment has passed,
   (d) making the calculated result in the step (c) correspond to the initial time increment in the first finite element nearest to the injection port so as to memorize in a recording device,
   (e) calculating fluid velocity, fluid pressure, density and viscosity of the foaming material within the first finite element after a subsequently predetermined second time increment has passed,
   (f) calculating fluid velocity, fluid pressure, density and viscosity of the foaming material within a second finite element adjacent to the first finite element by using an output value in the first finite element as an input value and the sum of the initial time increment and the second time increment which is an elapsed time of the foaming material passing through the injection pod until reaching the second finite element,
   (g) making the calculated results in steps (e) and (f) correspond to the position of the finite element space and to the elapsed time of the foaming material passing through the injection port until reaching the second finite element so as to memorize in the recording device,
   (h) repeating steps (e) through (g) until a sum total of the volumes of the finite elements becomes equal to the volume of the model space, and
   (I) using the results of the analysis to control the flow of foaming material injected through the injection port.

2. The method for analyzing the three-dimensional flow of the foaming material according to claim 1, further comprising a step of displaying an injected amount, density or viscosity of the foaming material using a contour line as a function of the elapsed time of the foaming material passing through the injection port until reaching the finite element.

3. The method for analyzing the three-dimensional flow of the foaming material according to claim 1, wherein said foaming material is formed by agitating two liquid materials in advance.

4. The method for analyzing the three-dimensional flow of the foaming material according to claim 1, wherein said foaming material is formed by agitating polyol containing cyclopentane foaming agent and isocyanate is injected into the model space.

* * * * *